(12) United States Patent
Abe et al.

(10) Patent No.: US 11,078,391 B2
(45) Date of Patent: Aug. 3, 2021

(54) URETHANE ADHESIVE COMPOSITION

(71) Applicant: Yokohama Rubber Co., LTD., Tokyo (JP)

(72) Inventors: Megumi Abe, Hiratsuka (JP); Yuichi Matsuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 15/750,145

(22) PCT Filed: Jul. 29, 2016

(86) PCT No.: PCT/JP2016/072328
§ 371 (c)(1),
(2) Date: Feb. 2, 2018

(87) PCT Pub. No.: WO2017/022666
PCT Pub. Date: Feb. 9, 2017

(65) Prior Publication Data
US 2018/0223144 A1    Aug. 9, 2018

(30) Foreign Application Priority Data
Aug. 3, 2015 (JP) .............................. JP2015-153046

(51) Int. Cl.
| | | |
|---|---|---|
| *C09J 175/04* | (2006.01) | |
| *C09J 11/06* | (2006.01) | |
| *C08G 18/48* | (2006.01) | |
| *C08G 18/71* | (2006.01) | |
| *C08G 18/79* | (2006.01) | |
| *C08G 18/32* | (2006.01) | |
| *C08G 18/20* | (2006.01) | |
| *C08G 18/76* | (2006.01) | |
| *C08G 18/10* | (2006.01) | |
| *C08G 18/12* | (2006.01) | |

(52) U.S. Cl.
CPC ............ *C09J 175/04* (2013.01); *C08G 18/10* (2013.01); *C08G 18/12* (2013.01); *C08G 18/2081* (2013.01); *C08G 18/3215* (2013.01); *C08G 18/4812* (2013.01); *C08G 18/4825* (2013.01); *C08G 18/4829* (2013.01); *C08G 18/718* (2013.01); *C08G 18/7671* (2013.01); *C08G 18/792* (2013.01); *C09J 11/06* (2013.01)

(58) Field of Classification Search
CPC ..... C09J 175/04; C09J 11/06; C08G 18/4812; C08G 18/2081; C08G 18/12; C08G 18/792; C08G 18/3215; C08G 18/718; C08G 18/4829; C08G 18/4825; C08G 18/7671; C08G 18/10
See application file for complete search history.

(56) References Cited

U.S. PATENT DOCUMENTS

| | | | |
|---|---|---|---|
| 2004/0097688 A1* | 5/2004 | Locken | C08F 283/006 528/59 |
| 2013/0206333 A1* | 8/2013 | Czaplicki | C09J 5/06 156/275.5 |
| 2013/0338330 A1* | 12/2013 | Nakagawa | C07C 263/10 528/65 |
| 2016/0137815 A1 | 5/2016 | Araki et al. | |
| 2017/0058076 A1 | 3/2017 | Araki | |
| 2017/0260434 A1 | 9/2017 | Matsuki et al. | |
| 2019/0030830 A1 | 1/2019 | Abe et al. | |

FOREIGN PATENT DOCUMENTS

| | | | |
|---|---|---|---|
| EP | 3 406 425 | 11/2018 | |
| JP | 2006-096912 | 4/2006 | |
| JP | 2006-96912 A * | 4/2006 | |
| JP | 2006-111811 A * | 4/2006 | |
| JP | 2015-131940 A * | 7/2015 | |
| WO | WO-2013072436 A1 * | 5/2013 | ......... C08G 18/3868 |
| WO | WO 2014/203750 | 12/2014 | |
| WO | WO-2016002518 A1 * | 1/2016 | ............. C09J 11/04 |
| WO | WO 2017/126362 | 7/2017 | |

OTHER PUBLICATIONS

International Search Report for International Application No. PCT/JP2016/072328 dated Oct. 11, 2016, 4 pages, Japan.

* cited by examiner

*Primary Examiner* — Rabon A Sergent
(74) *Attorney, Agent, or Firm* — Thorpe North & Western

(57) ABSTRACT

The present technology provides a urethane adhesive composition including a urethane prepolymer including an isocyanate group; an isocyanurate compound including an isocyanurate ring; and a terpene compound including an active hydrogen.

12 Claims, No Drawings

URETHANE ADHESIVE COMPOSITION

TECHNICAL FIELD

The present technology relates to a urethane adhesive composition.

BACKGROUND ART

In recent years, resin materials (e.g. olefin-based resins, and matrix resins of fiber reinforced plastic (FRP)) have been used for automobile bodies in place of steel plates from the perspective of reducing weight.

A urethane adhesive composition is used as a direct glazing material (DG material) used for bonding the body and window glass of an automobile together.

Alternatively, Japanese Unexamined Patent Publication No. 2006-96912 describes a two-part curable polyurethane resin composition including a main agent including (A) a urethane prepolymer formed by reacting (a) a polyol including from 10 to 60 mass % of polybutadiene polyol and (b) polyisocyanate, and (B) polyisocyanate including an isocyanurate group; and a curing agent including (C) a polyol including from 10 to 50 mass % of polybutadiene polyol; wherein the NCO/OH molar ratio between the isocyanate group included in the main agent and the hydroxy group included in the curing agent is from 0.8 to 1.05.

The present inventors prepared and evaluated the composition that includes the urethane prepolymer and the compound including the isocyanurate ring, with reference to Japanese Unexamined Patent Publication No. 2006-96912 and discovered that such a composition often presented inferior adhesion to an olefin-based resin and the like without a primer (i.e. a primer was not used on a substrate), or inferior properties of the cured product, such as hardness and elongation at break.

SUMMARY

The present technology provides a urethane adhesive composition that exhibits excellent adhesion without using a primer and superior physical properties when cured.

The present inventors discovered that a composition including a urethane prepolymer and a compound including an isocyanurate ring blended with a terpene compound including an active hydrogen can exhibit superior adhesion without using a primer and excellent physical properties when cured.

1. A urethane adhesive composition including a urethane prepolymer including an isocyanate group; an isocyanurate compound including an isocyanurate ring; and a terpene compound including an active hydrogen.

2. The urethane adhesive composition described in 1 above, wherein the isocyanurate compound is an isocyanurate compound of an aliphatic diisocyanate.

3. The urethane adhesive composition described in 2 above, wherein the isocyanurate compound of the aliphatic diisocyanate is an isocyanurate of the pentamethylene diisocyanate.

4. The urethane adhesive composition described in any one of 1 to 3 above, wherein the active hydrogen is derived from a phenol compound.

5. The urethane adhesive composition described in any one of 1 to 4 above, wherein the terpene compound is a phenol modified product of an oligomer of monoterpene or hydrogenated monoterpene.

6. The urethane adhesive composition described in any one of 1 to 5 above, further including a silane coupling agent.

7. The urethane adhesive composition described in any one of 1 to 6 above, for a use of adhering a base material including an olefin resin.

According to embodiments of the present technology, a urethane adhesive composition that exhibits excellent adhesion without using a primer and superior physical properties when cured is provided as described below.

DETAILED DESCRIPTION

Embodiments of the present technology are described in detail below.

Note that in the present specification, numerical ranges indicated using "(from) . . . to . . . " include the former number as the lower limit value and the later number as the upper limit value.

Also, note that in the present specification, when a component includes two or more types of materials, the content of the component refers to the total content of two or more types of the materials.

In the present specification, the case where at least one of the properties, adhesion without using a primer and physical properties of the cured product, is superior, is referred to as "superior effect of the present technology".

A urethane adhesive composition according to an embodiment of the present technology (adhesive composition according to an embodiment of the present technology) is a urethane adhesive composition including a urethane prepolymer including an isocyanate group; an isocyanurate compound including an isocyanurate ring; and a terpene compound including an active hydrogen.

The composition according to an embodiment of the present technology is thought to achieve desired effects as a result of having such a configuration. Although the reason is not clear, it is assumed to be as follows.

The predetermined terpene compound included in the adhesive composition according to an embodiment of the present technology includes an active hydrogen, and can react with a urethane prepolymer and/or an isocyanurate compound to impart flexibility to the resultant cured product. Thus, the adhesive composition according to an embodiment of the present technology is considered to exhibit superior adhesion and superior physical properties when cured.

Each of the components contained in the adhesive composition according to an embodiment of the present technology will be described in detail below.

Urethane Adhesive Composition
Urethane Prepolymer

The urethane prepolymer contained in the adhesive composition according to an embodiment of the present technology has an isocyanate group. An example of a preferable aspect is one in which the urethane prepolymer is a urethane prepolymer including a plurality of isocyanate groups (preferably two isocyanate groups).

The urethane prepolymer preferably has an isocyanate group at a molecular terminal.

As the urethane prepolymer, conventionally known urethane prepolymers can be used. For example, a reaction product, obtained by reacting a polyisocyanate compound with a compound including at least two active hydrogen-containing groups per molecule (hereinafter, abbreviated as "active hydrogen compound") in a manner that the amount of the isocyanate group is in excess relative to the amount of the active hydrogen-containing groups can be used.

In embodiments of the present technology, "active hydrogen-containing group" indicates "group containing an active hydrogen". Examples of the active hydrogen-containing group include a hydroxy group, an amino group, and an imino group.

Polyisocyanate Compound

The polyisocyanate compound used during production of the urethane prepolymer is not particularly limited as long as the polyisocyanate compound has two or more isocyanate groups in one molecule.

Examples of the polyisocyanate compound include aromatic polyisocyanates, such as tolylene diisocyanate (TDI; e.g. 2,4-tolylene diisocyanate and 2,6-tolylene diisocyanate), diphenylmethane diisocyanate (MDI; e.g. 4,4'-diphenylmethane diisocyanate, 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), and 1,5-naphthalene diisocyanate (NDI) and triphenylmethane triisocyanate; aliphatic and/or alicyclic polyisocyanates such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatemethyl)cyclohexane (H6XDI), and dicyclohexylmethane diisocyanate (H12MDI); and carbodiimide-modified polyisocyanate thereof.

The polyisocyanate compound may be used alone or a combination of two or more types of the polyisocyanate compounds may be used.

Among these, an aromatic polyisocyanate is preferable, and MDI is more preferable, from the perspective of excellent curability.

Active Hydrogen Compound

The compound including two or more active hydrogen-containing groups per molecule (active hydrogen compound) that is used during production of the urethane prepolymer is not particularly limited. Examples of the active hydrogen-containing group include a hydroxy (OH) group, an amino group, and an imino group.

Preferred examples of the active hydrogen compound include a polyol compound including two or more hydroxy (OH) groups per molecule, and a polyamine compound including two or more amino groups and/or imino groups per molecule. Among these, a polyol compound is preferable.

The molecular weight, skeleton, and the like of the polyol compound are not particularly limited as long as the polyol compound is a compound including two or more OH groups. Specific examples thereof include polyether polyols; polyester polyols; polymer polyols including a carbon-carbon bond in a main chain skeleton, such as acrylic polyols, polybutadiene diols, and hydrogenated polybutadiene polyols; low-molecular-weight polyhydric alcohols; and mixed polyols thereof. Among these, a polyether polyol is exemplified as an example of preferable aspects.

The polyether polyol is not particularly limited as long as the polyether polyol is a compound having a polyether as a main chain and including two or more hydroxy groups. "Polyether" is a group including two or more ether bonds, and specific examples thereof include a group including a total of two or more structural units: —$R^a$—O—$R^b$—. Note that, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, and sorbitol polyol The polyether polyol is preferably polypropylene glycol or polyoxypropylene triol from the perspective of excellent miscibility with a polyisocyanate compound.

The weight average molecular weight of the polyether polyol is preferably from 500 to 20000, from the perspective of the viscosity of the urethane prepolymer, obtained by a reaction with an isocyanate compound, exhibiting an appropriate fluidity at ambient temperature. In an embodiment of the present technology, the weight average molecular weight is a value obtained by GPC analysis (solvent: tetrahydrofuran (THF)) based on calibration with polystyrene.

The active hydrogen compound may be used alone, or a combination of two or more types of the active hydrogen compounds may be used.

The urethane prepolymer is preferably a urethane prepolymer formed by reacting a polyether polyol and an aromatic polyisocyanate compound, from the perspective of achieving even better adhesion and excellent curability.

The urethane prepolymer can be used alone or in combination of two or more kinds.

The method of producing the urethane prepolymer is not particularly limited. For example, the urethane prepolymer can be produced by using a polyisocyanate compound in a manner that from 1.5 to 2.5 mol of isocyanate group is reacted per 1 mol of the active hydrogen-containing group (e.g. hydroxy group) contained in the active hydrogen compound, and mixing these to perform a reaction.

The urethane prepolymer can be used alone or in combination of two or more kinds.

Isocyanurate Compound

The isocyanurate compound included in the adhesive composition according to an embodiment of the present technology has an isocyanurate ring.

A preferred example of the isocyanurate compounds is at least one type of compound selected from the group consisting of an isocyanurate compound of an aliphatic diisocyanate (C1), an isocyanurate compound of an aliphatic isocyanate silane (C2), a (meth)acrylate compound including an isocyanurate ring (C3), a thiol compound including an isocyanurate ring (C4), and a glycidyl compound including an isocyanurate ring (C5), from the perspective of superior adhesion to an olefin base material.

A "(meth)acrylate compound" herein refers to a compound including an acryloyloxy group or a methacryloyloxy group, and a "(meth)acryloyloxy group" described later refers to an acryloyloxy group or a methacryloyloxy group.

Isocyanurate Compound (C1)

The isocyanurate compound (C1) is an isocyanurate compound of an aliphatic diisocyanate.

Examples of the isocyanurate compound (C1) include an isocyanurate compound of aliphatic diisocyanate such as hexamethylene diisocyanate (HDI), pentamethylene diisocyanate, trimethylhexamethylene diisocyanate (TMHDI), lysine diisocyanate, and norbornane diisocyanate (NBDI).

Among these, preferred examples include a compound represented by Formula (C1-1) below, that is an isocyanurate of HDI, and a compound represented by Formula (C1-2) below, that is an isocyanurate of pentamethylene diisocyanate.

Furthermore, the most preferred example of the isocyanurate compound (C1) is a compound represented by Formula (C1-2) below, because its low viscosity can facilitate addition of the compound to the composition, and its low molecular weight can increase the content of the isocyanurate compound (C1) effectively with a small added amount.

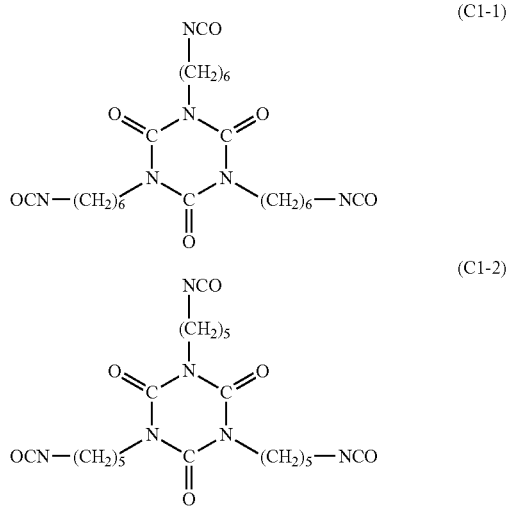

Isocyanurate Compound (C2)

The isocyanurate compound (C2) is an isocyanurate compound of an aliphatic isocyanate silane.

The aliphatic isocyanate silane that is capable of constituting the isocyanurate compound (C2) is a compound including an isocyanate group derived from an aliphatic compound and a hydrolyzable silicon-containing group. Such a compound can be obtained from a reaction of an aliphatic compound containing an isocyanate group and a compound including a functional group that can react with an isocyanate group and a hydrolyzable silicon-containing group, for example.

Specific examples of the isocyanurate compound (C2) include a compound obtained by isocyanurating an aliphatic isocyanate silane, such as isocyanate propyltriethoxysilane and isocyanate propyltrimethoxysilane.

(Meth)acrylate Compound (C3)

The (meth)acrylate compound (C3) above is not particularly limited as long as the compound includes an isocyanurate ring and a (meth)acryloyloxy group.

Specific examples of the (meth)acrylate compound (C3) above include ethoxylated isocyanuric acid triacrylate, ε-caprolactone derived tris(2-acryloxyethyl) isocyanurate; a compound obtained by a reaction between aliphatic diisocyanates, such as hexamethylene diisocyanate (HDI), pentamethylene diisocyanate, trimethylhexamethylene diisocyanate (TMHDI), lysine diisocyanate, norbornane diisocyanate (NBDI), and an acrylamide monomer containing a hydroxy group such as hydroxyethyl acrylamide, or an acrylate containing a hydroxy group such as 4-hydroxybutyl acrylate.

Thiol Compound (C4)

The thiol compound (C4) is not particularly limited as long as the compound includes an isocyanurate ring and a mercapto group.

Specific examples of the thiol compound (C4) above include tris(ethyl-3-mercaptopropionate)isocyanurate, and 1,3,5-tris(3-mercaptobutyryloxyethyl)-1,3,5-triazine-2,4,6 (1H,3H,5H)trione.

Glycidyl Compound (C5)

The glycidyl compound (C5) is not particularly limited as long as the compound includes an isocyanurate ring and an epoxy group.

Specific examples of the glycidyl compound (C5) above include 1,3,5-tris(2,3-epoxypropyl)-1,3,5-triazin-2,4,6(1H, 3H,5H)-trione.

The preferable isocyanurate compound is the isocyanurate compound of an aliphatic diisocyanate (C1) from the viewpoint of superior effects of the present technology.

The production of the isocyanurate compound is not particularly limited. Examples thereof include conventionally known methods. A commercially available product can be used as the isocyanurate compound.

The isocyanurate compound may be used alone or a combination of two or more types of the isocyanurate compounds may be used.

The content of the isocyanurate compound is preferably from 0.5 to 10 parts by mass, and more preferably from 1 to 5 parts by mass, per 100 parts by mass of the urethane prepolymer (A).

Terpene Compound Including Active Hydrogen

The terpene compound including an active hydrogen included in an adhesive composition according to an embodiment of the present technology (terpene compound) includes an active hydrogen and is a compound derived from terpene.

The terpene compound including an active hydrogen can include a hydroxy group as an active hydrogen, for example. Preferable active hydrogen is derived from a phenol compound from the viewpoint of superior effects of the present technology.

Examples of the terpene compound including an active hydrogen include: modified monoterpene such as monoterpene including an active hydrogen or hydrogenated monoterpene including an active hydrogen; and a modified oligomer such as a modified product of an oligomer of monoterpene or hydrogenated monoterpene, or an oligomer of modified monoterpene.

Terpene is a series of compounds in accordance with the isoprene rule, that is, a group of compounds represented by the molecular formula of $(C_5H_8)_n$. n above can be 2 to 8, for example.

Monoterpene is a compound represented by the molecular formula $(C_5H_8)_2$.

The oligomer can include from 2 to 6 repeating units derived from monoterpene or hydrogenated monoterpene. The oligomer may be a homopolymer (homooligomer) or a copolymer (cooligomer).

Monoterpene

Examples of the monoterpene that constitutes the predetermined terpene compound include a compound represented by Formula (1) below (α-pinene), a compound represented by Formula (2) below (β-pinene), a compound represented by Formula (3) below (limonene), myrcene, carvone, and camphor. One type of these may be used alone or two or more types of these may be used in combination.

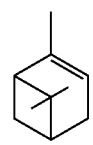

(1)

(2)

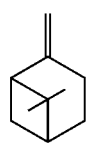

(3)

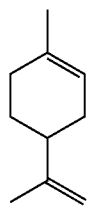

Hydrogenated Monoterpene

A hydrogenated monoterpene that constitutes the predetermined terpene compound is a terpene compound obtained by hydrogenation of the monoterpene described above. Hydrogenation may be partial hydrogenation.

Examples of the hydrogenated monoterpene include compounds represented by Formula (4) below (p-menthane).

(4)

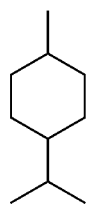

Modified Monoterpene

The modified monoterpene described above is monoterpene obtained by modification of the monoterpene or the hydrogenated monoterpene with a hydroxy group.

An example of a preferable aspect is one in which the modified monoterpene is monoterpene obtained by modification of monoterpene with a hydroxy group.

Examples of the modified monoterpene above include a compound represented by Formula (5) below (α-terpineol), a compound represented by Formula (6) below (β-terpineol), or a compound represented by Formula (7) below (γ-terpineol), and one type of these compounds may be used alone or two or more types may be used in combination.

(5)

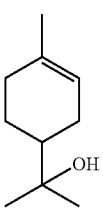

(6)

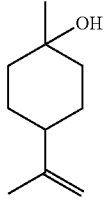

(7)

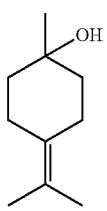

Modified Oligomer

The modified oligomer is preferably a modified product of a monoterpene or hydrogenated monoterpene oligomer, and more preferably a phenol modified product of a monoterpene or hydrogenated monoterpene oligomer.

An example of a preferable aspect is one in which the modified oligomer above is a compound including from 2 to 6 repeating units derived from monoterpene or modified monoterpene above.

Examples of the modified oligomer above include a terpene phenol resin. Specific examples include a compound represented by Formula (8) below (terpene phenol resin).

(8)

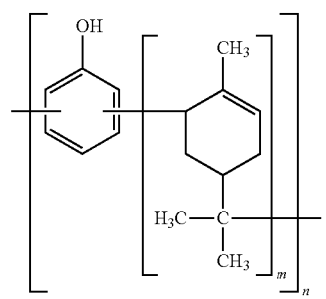

In Formula (8) above, m represents a number from 2 to 6, n represents a number from 1 to 3, and m×n represents a number from 2 to 6.

Furthermore, m and m×n is preferably from 2 to 5, and more preferably from 2 to 3.

Among the terpene compounds described above, the modified oligomer is preferably the modified oligomer described above, and more preferably the compound represented by Formula (8) above, from the viewpoint of less odor and better workability.

The terpene compound may be used alone or in a combination of two or more compounds. The method of producing the terpene compound is not particularly limited. Examples thereof include conventionally known methods.

The content of the terpene compound is preferably from 0.1 to 10 parts by mass, and more preferably from 0.1 to 3 parts by mass, per 100 parts by mass of the urethane prepolymer.

Silane Coupling Agent

The adhesive composition according to an embodiment of the present technology preferably further contains a silane coupling agent from the viewpoint of superior effect of the present technology.

Examples of the silane coupling agent include isocyanate silane; aminoalkoxysilane; mercaptoalkoxysilane; and a monosulfide compound having a monosulfide bond and hydrolyzable silyl group.

Among these, isocyanate silane and a monosulfide compound are preferable from the viewpoint of superior effect of the present technology.

Isocyanate Silane

The isocyanate silane is not particularly limited, provided that, for example, it is a silane coupling agent including an isocyanate group. Examples thereof include isocyanate propyltrimethoxysilane, isocyanate propyltriethoxysilane; and a compound obtained by an addition reaction of a polyisocyanate compound (excluding a compound including an isocyanurate ring) and at least one type of amine-based silane compound selected from the group consisting of N,N-bis[(3-trimethoxysilyl)propyl] amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, and 3-(n-propylamino) propyltrimethoxysilane.

Monosulfide Compound

An example of a preferable aspect is one in which the monosulfide compound has a monosulfide bond and a hydrolyzable silyl group wherein the monosulfide bond and a silicon atom contained in the hydrolyzable silyl group are bonded to each other.

The hydrolyzable group (the hydrolyzable group bonds to a silicon atom) contained in the hydrolyzable silyl group is not particularly limited. Examples of the hydrolyzable group include groups represented by R—O— (R is a hydrocarbon group that may have a hetero atom). Examples of the hydrocarbon group represented by R include alkyl groups, cycloalkyl groups, aryl groups (e.g. aryl groups having from 6 to 10 carbons), and combinations thereof. The hydrocarbon group may have a hetero atom such as an oxygen atom, a nitrogen atom, or a sulfur atom.

R is preferably an alkyl group, and more preferably an alkyl group having from 1 to 10 carbons.

The number of the hydrolyzable groups contained in one hydrolyzable silyl group may be 1 to 3. From the perspective of achieving even better adhesion, the number of the hydrolyzable groups contained in one hydrolyzable silyl group is preferably 3.

The hydrolyzable silyl group is preferably an alkoxysilyl group.

When the number of the hydrolyzable groups contained in one hydrolyzable silyl group is 1 or 2, the group that can bond to a silicon atom of the hydrolyzable silyl group is not particularly limited. Examples thereof include a hydrocarbon group that may have a hetero atom. Examples of the hydrocarbon group include alkyl groups (e.g. alkyl groups having from 1 to 20 carbons), cycloalkyl groups, aryl groups (e.g. aryl groups having from 6 to 10 carbons), aralkyl groups (e.g. aralkyl groups having from 7 to 10 carbons), alkenyl groups (e.g. alkenyl groups having from 2 to 10 carbons), and combinations thereof.

When the hydrocarbon group has a hetero atom, for example, at least one of the carbon atoms in the hydrocarbon group having two or more carbons may be substituted with hetero atom(s) or functional group(s) having a hetero atom (e.g. functional group that is at least divalent), and/or at least one of the hydrogen atoms in the hydrocarbon group (in this case, the number of carbons is not limited) may be substituted with functional group(s) having a hetero atom (e.g. functional group that is monovalent).

In the monosulfide bond, groups that are bonded to the monosulfide bond other than the hydrolyzable silyl group described above are not particularly limited.

From the perspective of achieving even better adhesion, an example of a preferable aspect is one in which the monosulfide compound further has a second hydrolyzable silyl group in addition to the hydrolyzable silyl group bonded to the monosulfide compound. In this case, the hydrolyzable silyl group bonded to the monosulfide bond via the silicon atom is a first hydrolyzable silyl group.

The second hydrolyzable silyl group is similar to the hydrolyzable silyl group bonded to the monosulfide bond.

The second hydrolyzable silyl group can bond to the monosulfide bond via a hydrocarbon group. The hydrocarbon group is not particularly limited. Examples of the hydrocarbon group include alkyl groups (e.g. alkyl groups having from 1 to 10 carbons), cycloalkyl groups, aryl groups, and combinations thereof.

An example of a preferable aspect is one in which the hydrocarbon group which is arranged in between the second hydrolyzable silyl group and the monosulfide bond is a divalent hydrocarbon group. Examples of the divalent hydrocarbon group include alkylene groups (e.g. alkylene groups having from 1 to 10 carbons), cycloalkylene groups, arylene groups, and combinations thereof.

The hydrocarbon group may be a straight-chain or branched-chain hydrocarbon group.

From the perspective of achieving even better adhesion, the monosulfide compound is preferably a compound represented by Formula (I) below.

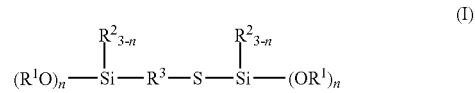

wherein, $R^1$ and $R^2$ are each independently a hydrocarbon group that may have a hetero atom; n is each independently an integer of 1 to 3; and $R^3$ is a hydrocarbon group.

The hydrocarbon group that may have a hetero atom of $R^1$ is similar to the hydrocarbon group that may have a hetero atom represented by R contained in the group represented by R—O— (e.g. alkoxy group) described above.

The hydrocarbon group that may have a hetero atom of $R^2$ is similar to the hydrocarbon group that may have a hetero atom as the group that can bond to the silicon atom of the hydrolyzable silyl group described above when the number of the alkoxy groups contained in one hydrolyzable silyl group is 1 or 2.

n is preferably each independently 3.

The hydrocarbon group of $R^3$ is similar to the hydrocarbon group which is arranged between the second hydrolyzable silyl group and the monosulfide bond described above. Examples of the hydrocarbon group include —$C_mH_{2m}$—. m is preferably an integer of 1 to 5.

From the perspective of achieving even better adhesion, the monosulfide compound is preferably a compound represented by Formula (II) below.

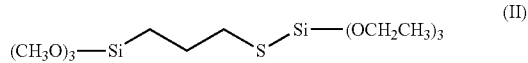

The method of producing the silane coupling agent is not particularly limited. Examples thereof include conventionally known methods. Examples of the method of producing a monosulfide compound include conventionally known methods such as a method in which mercaptosilane and tetraalkoxysilane are heated in the presence of an amine-based or metal-based catalyst to obtain alcohol and then the resulting alcohol is continuously or discontinuously distilled off.

A commercially available product can be used for the silane coupling agent.

A single silane coupling agent can be used alone or a combination of two or more can be used.

Examples of the combination of the silane coupling agent include a combination of isocyanate silane and a monosulfide compound.

When isocyanate silane and the monosulfide compound are used in combination as a silane coupling agent, the mass ratio of isocyanate silane to the monosulfide compound (isocyanate silane/monosulfide compound) is preferably from 50/1 to 5/1 and more preferably from 30/1 to 10/1, from the viewpoint of superior effect of the present technology.

The content of the silane coupling agent is preferably from 0.01 to 10 parts by mass, and more preferably from 0.1 to 5 parts by mass, per 100 parts by mass of the urethane prepolymer, from the viewpoint of superior effect of the present technology.

Other Optional Components

The adhesive composition according to an embodiment of the present technology may further contain, if necessary, various additives, in a range that does not inhibit the object of the present technology, such as fillers (e.g. carbon black and calcium carbonate), curing catalysts, plasticizers, anti-aging agents, antioxidants, pigments (dyes), thixotropic agents, ultraviolet absorbers, flame retardants, surfactants (including leveling agents), dispersing agents, dehydrating agents, adhesion promoters, and antistatic agents.

Carbon Black

The adhesive composition according to an embodiment of the present technology preferably further contains carbon black.

The carbon black is not particularly limited. Examples thereof include super abrasion furnace (SAF), intermediate super abrasion furnace (ISAF), high abrasion furnace (HAF), fast extruding furnace (FEF), general purpose furnace (GPF), semi-reinforcing furnace (SRF), fine thermal (FT), and medium thermal (MT).

Specifically, SEAST 9 (manufactured by Tokai Carbon Co., Ltd.) as the SAF, Showa Black N 220 (manufactured by Showa Cabot K.K.) as the ISAF, SEAST 3 (manufactured by Tokai Carbon Co., Ltd.) as the HAF, and HTC #100 (manufactured by Chubu Carbon K. K.) as the FEF are exemplified. Furthermore, Asahi #55 (manufactured by Asahi Carbon Co., Ltd.) and SEAST 5 (manufactured by Tokai Carbon Co., Ltd.) as the GPF, Asahi #50 (manufactured by Asahi Carbon Co., Ltd.) and Mitsubishi #5 (manufactured by Mitsubishi Chemical Corporation) as the SRF, Asahi Thermal (manufactured by Asahi Carbon Co., Ltd.) and HTC #20 (manufactured by Chubu Carbon K.K.) as the FT, and Asahi #15 (manufactured by Asahi Carbon Co., Ltd.) as the MT are exemplified.

The content of the carbon black is preferably from 30 to 70 parts by mass, and more preferably from 40 to 60 parts by mass, per 100 parts by mass of the urethane prepolymer.

Calcium Carbonate

The adhesive composition according to an embodiment of the present technology preferably further contains calcium carbonate.

Calcium carbonate is not particularly limited. Examples thereof include heavy calcium carbonate, precipitated calcium carbonate (light calcium carbonate), and colloidal calcium carbonate.

The content of the calcium carbonate is preferably from 20 to 70 parts by mass, and more preferably from 30 to 50 parts by mass, per 100 parts by mass of the urethane prepolymer.

Examples of the fillers other than carbon black and calcium carbonate include organic or inorganic fillers of any form. Specific examples thereof include silica such as fumed silica, calcined silica, precipitated silica, pulverized silica, molten silica; diatomaceous earth; iron oxide, zinc oxide, titanium oxide, barium oxide, magnesium oxide; magnesium carbonate, zinc carbonate; pyrophyllite clay, kaolin clay, calcined clay; fatty acid treated products, resin acid treated products, urethane compound treated products, and fatty acid ester treated products thereof.

The surface of the filler may be treated with at least one type of treatment agent selected from the group consisting of fatty acids, resin acids, urethane compounds and fatty acid esters.

Curing Catalyst

The curing agent described above is not particularly limited, but specific examples include carboxylic acids such as 2-ethylhexanoic acid, and oleic acid; phosphates such as polyphosphoric acid, ethyl acid phosphate, and butyl acid phosphate; bismuth catalysts such as bismuth octoate; tin catalysts such as dibutyltin dilaurate, and dioctyltin dilaurate; tertiary amine catalysts such as 1,4-diazabicyclo[2.2.2] octane, 2,4,6-tris(dimethylaminomethyl)phenol (e.g. DMP-30) and a compound including a dimorpholinodiethylether structure.

Furthermore, the curing catalyst is preferably a compound having a dimorpholinodiethylether structure from the perspective of superior effect of the present technology.

The dimorpholinodiethyl ether structure is a structure including a dimorpholinodiethyl ether as a basic structure.

In the dimorpholinodiethyl ether structure, the hydrogen atom contained in the morpholine ring may be substituted with a substituent. The substituent is not particularly limited. Examples thereof include alkyl groups. Examples of the alkyl group include a methyl group and an ethyl group.

Examples of the amine catalyst including the dimorpholinodiethyl ether structure include a compound represented by Formula (9) below.

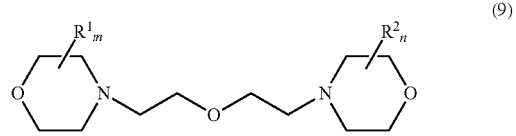

(9)

wherein, $R^1$ and $R^2$ are each independently an alkyl group, and m and n are each independently 0, 1, or 2.

Specific examples of the amine catalyst including a dimorpholinodiethyl ether structure include dimorpholinodiethyl ether (DMDEE), di(methylmorpholino)diethyl ether, and di(dimethylmorpholino)diethyl ether.

A single curing catalyst can be used or a combination of two or more curing catalysts can be used.

The content of the curing catalyst is preferably from 0.05 to 2.0 parts by mass, and more preferably from 0.1 to 0.5 parts by mass, per 100 parts by mass of the urethane prepolymer.

Plasticizer

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types of these may be used in combination.

The content of the plasticizer is preferably from 1 to 50 parts by mass, and more preferably from 5 to 30 parts by mass, per 100 parts by mass of the urethane prepolymer.

Production Method

The method of producing the adhesive composition according to an embodiment of the present technology is not particularly limited. Examples thereof include mixing the urethane prepolymer, the isocyanurate compound, and the terpene compound including an active hydrogen, and optionally, the silane coupling agent, which can be used, and other optional components to produce the adhesive composition.

An example of preferable aspects is one in which the adhesive composition according to an embodiment of the present technology is a one-part adhesive composition.

Use

Examples of the base material to which the adhesive composition according to an embodiment of the present technology can be applied include plastics, glass, rubbers, and metals. A preferred example of the base material is a base material including an olefin resin. The base material including an olefin resin may be a base material obtained from a mixture of an olefin resin and glass (e.g. glass fillers).

Examples of the plastic include polymers of propylene-, ethylene-, and/or cycloolefin-based monomers. The polymers described above may be homopolymers, copolymers, or hydrogenated products.

Specific examples of the plastic include hardly adhesive resins including olefin resins, such as polypropylene, polyethylene, cycloolefin polymers (COP), and cycloolefin copolymers (COC), polyester resins, such as polyethylene terephthalate (PET) and polybutylene terephthalate (PBT), polymethyl methacrylate resins (PMMA resins), polycarbonate resins, polystyrene resins, acrylonitrile-styrene copolymer resins, polyvinyl chloride resins, acetate resins, acrylonitrile-butadiene-styrene resins (ABS resins), and polyamide resins.

Note that "COC" refers to cycloolefin copolymers, such as copolymers of tetracyclododecene and olefins such as ethylene.

Furthermore, "COP" refers to cycloolefin polymers, such as polymers obtained by, for example, subjecting norbornenes to ring-opening polymerization and hydrogenation.

The base material may have undergone a surface treatment. Examples of the surface treatment include flame treatment, corona treatment, and ITRO treatment. These treatments are not particularly limited. Examples thereof include conventionally known treatments.

The method of applying the adhesive composition according to an embodiment of the present technology to the base material is not particularly limited. Examples thereof include conventionally known methods.

When the adhesive composition according to an embodiment of the present technology is used, excellent adhesion can be exhibited without using a primer for the base material.

The adhesive composition according to an embodiment of the present technology can be cured by moisture. For example, the adhesive composition according to an embodiment of the present technology can be cured in the condition of 5 to 90° C. at a relative humidity of 5 to 95 (% RH).

Application

Examples of the use of the adhesive composition according to an embodiment of the present technology include direct glazing adhesives, sealants for automobiles, and sealants for building components.

EXAMPLES

The present technology is described below in detail using examples. However, no such limitation to the present technology is intended.

Synthesis of Urethane Prepolymer 1

A urethane prepolymer (1) containing 2.10 mass % of isocyanate group was synthesized by mixing 700 g of polyoxypropylene diol (weight average molecular weight: 2000), 300 g of polyoxypropylene triol (weight average molecular weight: 3000), and 499 g of 4,4'-diphenylmethane diisocyanate (molecular weight: 250) (NCO/OH=2.0 in this case), further adding 500 g of diisononyl phthalate, and stirring the mixture in a nitrogen gas stream at 80° C. for 12 hours to allow reaction to proceed.

Production of Adhesive Composition

Each component shown in Table 1 below was used in the composition (part by mass) shown in Table 1 and mixed by an agitator to produce corresponding adhesive composition.

Evaluation

The adhesive compositions produced as described above were evaluated by the methods described below. The results are shown in Table 1.

Adhesion

Preparation of Olefin Base Material Sample

A piece of adherend was prepared by flame-treating one face of a base material (width: 25 mm, length: 120 mm, thickness: 3 mm, trade name: Nobrene, manufactured by Sumitomo Chemical Co., Ltd.) formed from an olefin resin.

After the adherends were flame-treated, it was confirmed that the wettability on the surface of the resin was 45.0 mN/m or greater, using the Wetting Tension Test Mixture (manufactured by Wako Pure Chemical Industries, Ltd.).

Subsequently, each adhesive composition immediately after preparation (mixing) was applied to the surface of the adherend (the surface subjected to flame treatment) to the thickness of 3 mm and left under the environment of 23° C. and 50% relative humidity for 3 days to prepare the olefin base material sample.

Preparation of PP-GF Base Material Sample

The PP-GF base material sample was prepared in the same procedure as in the preparation of the olefin base material sample, except that the PP-GF base material (a base material made from polypropylene containing 20 mass % of glass filler, trade name R-200G, available from Prime Polymer Co. Ltd.) was used instead of the base material made from olefin resin.

Heat Resistance Test

The olefin base material sample and the PP-GF base material sample prepared as described above were further subjected to heat resistance test, wherein the samples were placed in an oven at 100° C. for 10 days.

Hand Peeling Test

Using the initial olefin base material sample or PP-GF base material sample prepared as above, or the olefin base material sample or PP-GF base material sample after heat resistance test, hand peel test was carried out under the condition of 23° C., wherein the adhesive was peeled off from each sample by hand and the failure state after the hand peel test was visually observed.

The case where the adhesive exhibited cohesive failure was denoted as CF.

The case where the adhesive exhibited interfacial failure was denoted as AF.

Note that, in Table 1 below, "CF value" indicates the ratio of cohesive failure to the total area of base material that was adhered with the adhesive and "AF value" indicates the ratio of adhesive failure (interfacial failure) to the total area of base material that was adhered with the adhesive. For example, "CF80AF20" indicates that cohesive failure is 80% and adhesive failure is 20%.

Physical Properties of Cured Product
Sample for Evaluation of Physical Properties of the Cured Product: Dumbbell-Shaped Type-III Sample Piece Each adhesive composition produced as above was cured under the condition of 23° C., 50% RH for 5 days and a dumbbell-shaped No. 3 sample piece of 3 mm thickness was cut out from the cured product.

Hardness

The multiple dumbbell-shaped No. 3 sample pieces prepared as above were stacked together to the thickness of not less than 12.0 mm and Japanese Industrial Standards (JIS) A hardness was measured in accordance with JIS K6253.

Elongation at Break

Tensile test in accordance with JIS K6251 (2010) was carried out using the dumbbell-shaped No. 3 sample piece prepared as above under the conditions of 23° C. and the tensile test speed of 500 mm/min. Thus, the elongation at break (%) was determined.

TABLE 1

| | | Comparative Example 1 | Comparative Example 2 | Example 1 |
|---|---|---|---|---|
| Urethane prepolymer 1 | | 100 | 100 | 100 |
| Isocyanurate compound 1 | | 3.0 | 3.0 | 3.0 |
| Isocyanurate compound 2 | | | | |
| Terpene compound including active hydrogen 1 | | | | 1.0 |
| (For comparison) Terpene compound | | | 1.0 | |
| Silane coupling agent 1 | | | | |
| Silane coupling agent 2 | | | | |
| Carbon black | | 48.6 | 48.6 | 48.6 |
| Calcium carbonate | | 45.5 | 45.5 | 45.5 |
| Plasticizer | | 41.0 | 41.0 | 41.0 |
| Curing catalyst | | 0.5 | 0.5 | 0.5 |
| Adhesion to olefin base material | Initial | CF80AF20 | CF95AF5 | CF100 |
| | After heat resistance test | CF60AF40 | CF75AF25 | CF90AF10 |
| Adhesion to PP-GF material | Initial | CF75AF25 | CF70AF30 | CF95AF5 |
| | After heat resistance test | CF80AF20 | CF80AF20 | CF85AF15 |
| Physical properties of cured product | JIS A hardness | 58 | 52 | 45 |
| | Elongation at break (%) | 240 | 290 | 450 |

| | | Example 2 | Example 3 | Example 4 | Example 5 |
|---|---|---|---|---|---|
| Urethane prepolymer 1 | | 100 | 100 | 100 | 100 |
| Isocyanurate compound 1 | | 2.5 | 2.5 | | 2.5 |
| Isocyanurate compound 2 | | | | 2.5 | |
| Terpene compound including active hydrogen 1 | | 0.5 | 0.5 | 0.5 | 0.5 |
| (For comparison) Terpene compound | | | | | |
| Silane coupling agent 1 | | 1.5 | | 1.5 | 1.5 |
| Silane coupling agent 2 | | | 0.1 | 0.1 | 0.1 |
| Carbon black | | 48.6 | 48.6 | 48.6 | 48.6 |
| Calcium carbonate | | 45.5 | 45.5 | 45.5 | 45.5 |
| Plasticizer | | 41.0 | 41.0 | 41.0 | 41.0 |
| Curing catalyst | | 0.5 | 0.5 | 0.5 | 0.5 |
| Adhesion to olefin base material | Initial | CF100 | CF100 | CF100 | CF100 |
| | After heat resistance test | CF100 | CF100 | CF100 | CF100 |
| Adhesion to PP-GF material | Initial | CF95AF5 | CF100 | CF95AF5 | CF100 |
| | After heat resistance test | CF85AF15 | CF90AF10 | CF90AF10 | CF100 |
| Physical properties of cured product | JIS A hardness | 48 | 47 | 49 | 48 |
| | Elongation at break (%) | 390 | 400 | 410 | 420 |

The details of each component shown in Table 1 above are as follows.

Urethane prepolymer 1: Urethane prepolymer synthesized as above. Note that the used amount (100 parts by mass) of the urethane prepolymer 1 was the net amount of the urethane prepolymer.

Isocyanurate compound 1: An isocyanurate of pentamethylenediisocyanate represented by Formula (C1-2) below.

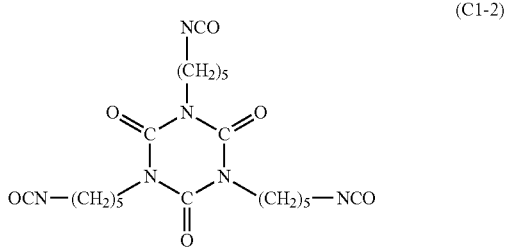

Isocyanurate compound 2: An isocyanurate of hexamethylenediisocyanate (Duranate TPA100, available from Asahi Kasei Chemicals Co., Ltd.) Terpene compound including an active hydrogen 1: A compound represented by Formula (8) above, (YS Resin CP, available from Yasuhara Chemical Co., Ltd.) (For comparison) Terpene compound: A terpene compound including no active hydrogen, sesquiterpene (trade name: Longifolene, available from Yasuhara Chemical Co., Ltd.)

Silane coupling agent 1: Isocyanate propyltrimethoxysilane (trade name: Y-5187, available from Momentive Performance Materials Inc.)

Silane coupling agent 2: A compound represented by Formula (II) below.

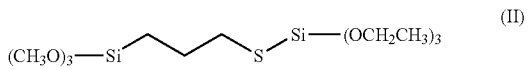

Carbon black: #200 MP, available from NSCC Carbon Co., Ltd.

Calcium carbonate: Super S, available from Maruo Calcium Co., Ltd.

Plasticizer: DINP, diisononyl phthalate, available from Jay Plus, Inc. Note that the plasticizer in Table 1 included diisononyl phthalate that was used in the preparation of the urethane prepolymer 1.

Curing catalyst: DMDEE, available from San-Apro Ltd.

As is clear from the results shown in Table 1, the adhesive composition of Comparative Example 1, which contained no predetermined terpene compound, exhibited poor adhesion and the cured product obtained exhibited poor physical properties, such as excessive hardness and small elongation at break.

The adhesive composition of Comparative Example 2, which contained no predetermined terpene compound but contained the terpene compound including no active hydrogen instead, exhibited poor adhesion and the cured product obtained exhibited poor physical properties, such as excessive hardness and small elongation at break.

In contrast, the adhesive composition according to an embodiment of the present technology exhibited superior desired effects.

Furthermore, as for the effect of presence of the silane coupling agent, the comparison between Example 1 and Examples 2, 3, and 5, revealed that the case where the composition further included the silane coupling agent exhibited superior adhesion and produced the cured product with suitably higher hardness, compared to the case where the composition included no silane coupling agent.

As for the type of the isocyanurate compound, the comparison between Examples 4 and 5 revealed that Example 5, which included the isocyanurate of pentamethylenediisocyanate, exhibited superior adhesion and larger elongation at break compared to Example 4, which included the isocyanurate of hexamethylenediisocyanate.

The adhesive composition according to an embodiment of the present technology exhibits excellent heat-resistant adhesiveness without using a primer.

The invention claimed is:

1. A urethane adhesive composition comprising a urethane prepolymer comprising an isocyanate group; an isocyanurate compound comprising an isocyanurate ring; a terpene compound comprising an active hydrogen; and a monosulfide compound; wherein
    the isocyanurate compound is an isocyanurate compound of an aliphatic diisocyanate; and
    the urethane adhesive composition is a one-part adhesive composition.

2. The urethane adhesive composition according to claim 1, wherein the isocyanurate compound of the aliphatic diisocyanate is an isocyanurate of pentamethylene diisocyanate.

3. The urethane adhesive composition according to claim 1, wherein the active hydrogen is derived from a phenol compound.

4. The urethane adhesive composition according to claim 1, wherein the terpene compound is a phenol modified product of an oligomer of monoterpene or hydrogenated monoterpene.

5. The urethane adhesive composition according to claim 1, for a use of adhering a base material comprising an olefin resin.

6. The urethane adhesive composition according to claim 2, wherein the active hydrogen is derived from a phenol compound.

7. The urethane adhesive composition according to claim 2, wherein the terpene compound is a phenol modified product of an oligomer of monoterpene or hydrogenated monoterpene.

8. The urethane adhesive composition according to claim 3, wherein the terpene compound is a phenol modified product of an oligomer of monoterpene or hydrogenated monoterpene.

9. The urethane adhesive composition according to claim 2, for a use of adhering a base material comprising an olefin resin.

10. The urethane adhesive composition according to claim 3, for a use of adhering a base material comprising an olefin resin.

11. The urethane adhesive composition according to claim 4, for a use of adhering a base material comprising an olefin resin.

12. The urethane adhesive composition according to claim 1, further comprising isocyanate silane.

* * * * *